United States Patent
C S et al.

(10) Patent No.: US 11,296,783 B2
(45) Date of Patent: Apr. 5, 2022

(54) MANAGING SATELLITE DEVICES WITHIN A BRANCH NETWORK

(71) Applicant: Juniper Networks, Inc., Sunnyvale, CA (US)

(72) Inventors: Hariharasubramanian C S, Bangalore (IN); Mallikarjun Tallapragada, Bangalore (IN); Sudheendra Gopinath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 371 days.

(21) Appl. No.: 16/365,918

(22) Filed: Mar. 27, 2019

(65) Prior Publication Data

US 2020/0313759 A1    Oct. 1, 2020

(51) Int. Cl.
*H04B 7/185*    (2006.01)
*H04W 76/15*   (2018.01)
(Continued)

(52) U.S. Cl.
CPC ......... *H04B 7/18584* (2013.01); *H04L 12/10* (2013.01); *H04L 41/0806* (2013.01);
(Continued)

(58) Field of Classification Search
CPC .. H04B 7/18584; H04W 76/15; H04W 76/10; H04W 76/00; H04W 24/06; H04W 24/08;
(Continued)

(56) References Cited

U.S. PATENT DOCUMENTS

| 8,230,110 B2 | 7/2012 | Vegesna et al. |
| 8,526,427 B1 | 9/2013 | Smith et al. |

(Continued)

FOREIGN PATENT DOCUMENTS

| CN | 1871822 A | 11/2006 |
| CN | 102546742 A | 7/2012 |
| CN | 105991445 A | 10/2016 |

OTHER PUBLICATIONS

Response to Extended Search Report dated Jan. 17, 2020 from counterpart European Application No. 19181703.0, filed Mar. 22, 2021, 18 pp.

(Continued)

*Primary Examiner* — Mounir Moutaouakil
(74) *Attorney, Agent, or Firm* — Shumaker & Sieffert, P.A.

(57) ABSTRACT

This disclosure is related to devices, systems, and techniques for using an aggregation device to manage satellite devices that are coupled to host devices. For example, a system includes a set of satellite devices providing switching functionality and an aggregation device configured to communicate with an orchestrator of a wide area network (WAN), where the aggregation device serves as a master switch and is coupled to the set of satellite devices via a set of cascade ports. The aggregation device is configured to detect, using a port extension service virtual network function (VNF) executing on the aggregation device, each satellite device of the set of satellite devices coupled to the aggregation device and send, to the orchestrator, data indicating the satellite devices as respective sub-systems within a logical switch comprising the aggregation device and the set of satellite devices.

20 Claims, 7 Drawing Sheets

(51) Int. Cl.
*H04L 12/10* (2006.01)
*H04L 41/0806* (2022.01)
*H04L 41/0816* (2022.01)
*H04L 41/0893* (2022.01)
*H04L 61/5007* (2022.01)

(52) U.S. Cl.
CPC ...... *H04L 41/0816* (2013.01); *H04L 41/0893* (2013.01); *H04L 61/2007* (2013.01); *H04W 76/15* (2018.02)

(58) Field of Classification Search
CPC . H04L 12/10; H04L 41/0806; H04L 41/0816; H04L 41/0893; H04L 61/2007; H04L 12/4625; H04L 41/0803; H04L 41/12; H04L 49/15; H04L 41/04; H04L 12/4641; Y02D 30/00
See application file for complete search history.

(56) References Cited

U.S. PATENT DOCUMENTS

| | | | |
|---|---|---|---|
| 8,560,660 | B2 | 10/2013 | Kalusivalingam et al. |
| 8,797,844 | B1 | 8/2014 | Strahle et al. |
| 10,911,296 | B2 * | 2/2021 | S .............................. H04L 47/70 |
| 2006/0171302 | A1 | 8/2006 | Tallet |
| 2007/0268516 | A1 * | 11/2007 | Bugwadia ........... H04L 41/0886 358/1.15 |
| 2010/0058232 | A1 * | 3/2010 | De Silva ............. H04L 12/4641 715/810 |
| 2014/0269710 | A1 | 9/2014 | Sundaram et al. |
| 2014/0310391 | A1 | 10/2014 | Sorenson, III et al. |
| 2015/0370668 | A1 | 12/2015 | Nazari et al. |
| 2016/0359805 | A1 | 12/2016 | Spraggs et al. |
| 2018/0198634 | A1 * | 7/2018 | Lentczner ........... H04L 61/6022 |
| 2019/0132261 | A1 * | 5/2019 | Vashisht ................ H04L 45/02 |
| 2019/0171474 | A1 * | 6/2019 | Malboubi ........... H04L 61/2061 |
| 2019/0335386 | A1 * | 10/2019 | Murray ............... H04L 43/0811 |
| 2020/0204452 | A1 * | 6/2020 | Bhat ................... H04L 41/0883 |
| 2020/0295968 | A1 * | 9/2020 | Mundt .................... H04L 63/20 |

OTHER PUBLICATIONS

Juniper Networks, Inc. "Juno Fusion Data Center Overview" Junos Fusion Data Center Feature Guide available at https://www.juniper.net/documentation/en_US/junos/topics/concept/junos-fusion-data-center-overview.html (accessed Mar. 22, 2018), modified Nov. 30, 2017, 2 pp.

Juniper Networks, Inc. "Simplify the Data Center with Junos Fusion" Juniper Networks Fabric Technology, White Paper, 2015 (Applicant points out, in accordance with MPEP 609.04(a), that the year of publication, 2015, is sufficiently earlier than the effective U.S. filing date Mar. 23, 2018, so that the particular month of publication is not in issue.) 7 pp.

Juniper Networks, Inc. "Understanding Junos Fusion Data Center Components" Junos Fusion Data Center Feature Guide available at https://www.juniper.net/documentation/en_US/junos/topics/concept/fusion-data-center-components.html (accessed Mar. 22, 2018), modified Dec. 6, 2017, 5 pp.

U.S. Appl. No. 15/819,265, by Juniper Networks, Inc. (Inventor: Craig Frink), filed Nov. 21, 2017.

U.S. Appl. No. 15/933,902, by Juniper Networks, Inc. (Inventor: Vishnu Janardhanan S), filed Mar. 23, 2018.

U.S. Appl. No. 15/398,366, by Juniper Networks, Inc. (Inventor: Shashvat A. Thakor), filed Jan. 4, 2017.

Anilak, "Howto bring up Junos Fusion Enterprise Dual Aggregated System," https://forums.juniper.net/t5/tkb/articleprintpage/tkbid/Switching_TKB/articleid/25, J-Net Community, Aug. 23, 2016, 9 pp.

IEEE Std 802.1BR™-2012, "IEEE Standard for Local and metropolitan area networks—Virtual Bridged Local Area Networks—Bridge Port Extension," IEEE Computer Society, Jul. 16, 2012, 135 pp.

Juniper Networks, Inc, "Understanding Junos Fusion Ports," Juniper Networks Tech Library, Aug. 20, 2018, 6 pp.

"Junos Fusion Provider Edge Overview," Tech Library—Juniper Networks, Mar. 26, 2019, Retrieved from: https://www.juniper.netldocumentation/en_US/junos/topics/concept/fusion-provider-edge-overview.html, accessed Dec. 19, 2019, 4 pp.

Extended Search Report from counterpart European Application No. 19181703.0, dated Jan. 17, 2020, 10 pp.

* cited by examiner

MANAGING SATELLITE DEVICES WITHIN A BRANCH NETWORK

TECHNICAL FIELD

This disclosure relates to computer networks.

BACKGROUND

A computer network is a collection of interconnected computing devices that exchange data and share resources. In certain types of computer networks, such as enterprise networks, data center networks, and service provider access networks, administrators need to configure and manage large numbers of endpoint users or customers attempting to send and receive data through the network.

As one example, a network connects a plurality of remote branch sites that belong to a single enterprise, such as a university, corporation, business, or other large entity. Each of the branch sites may include a private network, such a local area network (LAN) or wide area network (WAN) that includes a plurality of customer devices, such as desktop computers, laptops, workstations, personal digital assistants (PDAs), Internet of Things (IOT) devices, wireless devices, network-ready appliances, file servers, print servers or other devices.

A network may include a branch site switch that manages connectivity between hosts or endpoints within the network. The branch site switch may include a plurality of network devices, e.g., routers and/or switches, that provide hosts with access to the network, and to provide hosts with connectivity for host-to-host traffic within and between the branch sites.

SUMMARY

In general, the disclosure is directed to devices, systems, and techniques for using an aggregation device to manage satellite devices that are coupled to host devices. More specifically, the aggregation device is connected to one or more client devices, also referred to as access switches or satellite devices, such as in a two-tier structure to form a switch fabric. The aggregation device centrally manages interface configuration for each satellite device interface. For example, the aggregation device includes cascade ports for sending and receiving control and network traffic from satellite devices. The satellite devices each include one or more host-facing ports, also referred to as extended ports, that transmit and receive network traffic from the hosts, and are associated with the cascade ports of the aggregation device. The extended ports, in some cases, may be Power over Ethernet (PoE) ports.

Additionally, in some examples, the aggregation device may include a management interface configured to communicate with an orchestrator of a wide area network (WAN) or communicate with other components of the WAN. The orchestrator may be configured to communicate with, or manage, additional aggregation devices which may be placed in separate locations. In this way, the aggregation device and the satellite devices coupled to the aggregation device may represent a local area network (LAN) which represents a sub-network of the WAN that includes the orchestrator. As such, the orchestrator may be configured to manage a set of aggregation devices which in turn manage sets of respective switching devices. The aggregation device, the set of respective satellite devices, and the host devices coupled to the set of respective satellite devices may, in some cases, represent a "branch office" within the WAN. Additionally, in some cases, the orchestrater may be located within a "central office" of the WAN, where the central office manages branch offices by communicating with a respective aggregation device corresponding to each branch office.

The aggregation device which manages a set of satellite devices may, in some examples, include a forwarding unit such as a packet forwarding engine (PFE). In some cases, the forwarding unit may forward packets based on whether a respective packet is destined for a host device within the branch office that houses the aggregation device, or whether the respective packet is destined for the WAN (e.g., if the respective packet is destined for a host device coupled to a satellite device that is not managed by the aggregation device). For example, if the respective packet is destined for a host device within the branch office, the PFE may determine a cascade port corresponding to the satellite device, enabling the PEE to forward the respective packet to the host device via the cascade port. In some examples, if the respective packet is destined for the WAN, the PFE may forward the respective packet to the WAN via a WAN uplink.

The techniques of this disclosure provide a port extension service as a VNF, including tunneling functionality (e.g., 802.1BR) for port extension, such as for branch sites where universal customer premises equipment (uCPE) devices are used. The techniques enable the uCPE to represent the access switches as the satellite devices in the managed LAN, and the PoE capable ports as "extended ports" of the uCPE device itself, by which the general-purpose server logically becomes a massive PoE-capable switch.

The techniques of this disclosure may provide one or more advantages. For example, by enabling the aggregation device to manage the set of satellite devices, obviating a need for the orchestrator to manage the set of satellite devices, an operating efficiency of the orchestrator may be improved. In other words, it may be beneficial to delegate management of the satellite devices to the aggregation device in order to simplify tasks required of the orchestrator, decreasing a likelihood that the orchestrator will become overburdened and go offline. In some examples, it may be beneficial for the aggregation device to include virtual network functions (VNFs) and the forwarding unit configured for both routing packets within the branch office and forwarding packets outside of the branch office, the VNFs enabling the aggregation device to implement one or more security features. Additionally, since the satellite devices route packets through the aggregation device, which includes a rich set of access and control features, it might not be necessary for the satellite devices to include such access and control features, which may be expensive to include in satellite devices. In this way, it may be possible to cost-effectively add or remove large numbers of satellite devices to the LAN which is managed via the aggregation device. Additionally, configuring the satellite devices using the aggregation device instead of the orchestrator may allow for a greater level of scalability with respect to the satellite devices, such as by making it easier to add or remove satellite devices (e.g., switches) in large-scale networks. In other words, it may be easier to connect switches to the aggregation device from a user standpoint.

In some examples, a system includes a set of satellite devices providing switching functionality and an aggregation device configured to communicate with an orchestrator of a wide area network (WAN), where the aggregation device serves as a master switch and is coupled to the set of satellite devices via a set of cascade ports. The aggregation device is configured to detect, using a port extension service virtual network function (VNF) executing on the aggregation device, each satellite device of the set of satellite devices coupled to the aggregation device and send, to the orchestrator, data indicating the satellite devices as respective sub-systems within a logical switch including the aggregation device and the set of satellite devices. Additionally, the aggregation device is configured to receive, from the orchestrator, configuration information for managing at least one sub-system within the logical switch, and configure, by the port extension service based on the configuration information, the satellite device of the set of satellite devices corresponding to the sub-system.

In some examples, a method includes communicating, using an aggregation device, with an orchestrator of a wide area network (WAN), where the aggregation device serves as a master switch and is coupled to a set of satellite devices via a set of cascade ports, where the set of satellite devices provide switching functionality, detecting, using a port extension service virtual network function (VNF) executing on the aggregation device, each satellite device of the set of satellite devices coupled to the aggregation device, sending, to the orchestrator, data indicating the satellite devices as respective sub-systems within a logical switch including the aggregation device and the set of satellite devices, receiving, from the orchestrator, configuration information for managing at least one sub-system within the logical switch, and configuring, by the port extension service based on the configuration information, the satellite device of the set of satellite devices corresponding to the sub-system.

In some examples, a non-transitory computer-readable storage medium stores instructions that when executed cause one or more programmable processors of an aggregation device to communicate with an orchestrator of a wide area network (WAN), where the aggregation device serves as a master switch and is coupled to a set of satellite devices via a set of cascade ports, where the set of satellite devices provide switching functionality, detect, using a port extension service virtual network function (VNF) executing on the aggregation device, each satellite device of the set of satellite devices coupled to the aggregation device, and send, to the orchestrator, data indicating the satellite devices as respective sub-systems within a logical switch including the aggregation device and the set of satellite devices. Additionally, the instructions cause one or more programmable processors of an aggregation device to receive, from the orchestrator, configuration information for managing at least one sub-system within the logical switch and configure, by the port extension service based on the configuration information, the satellite device of the set of satellite devices corresponding to the sub-system.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
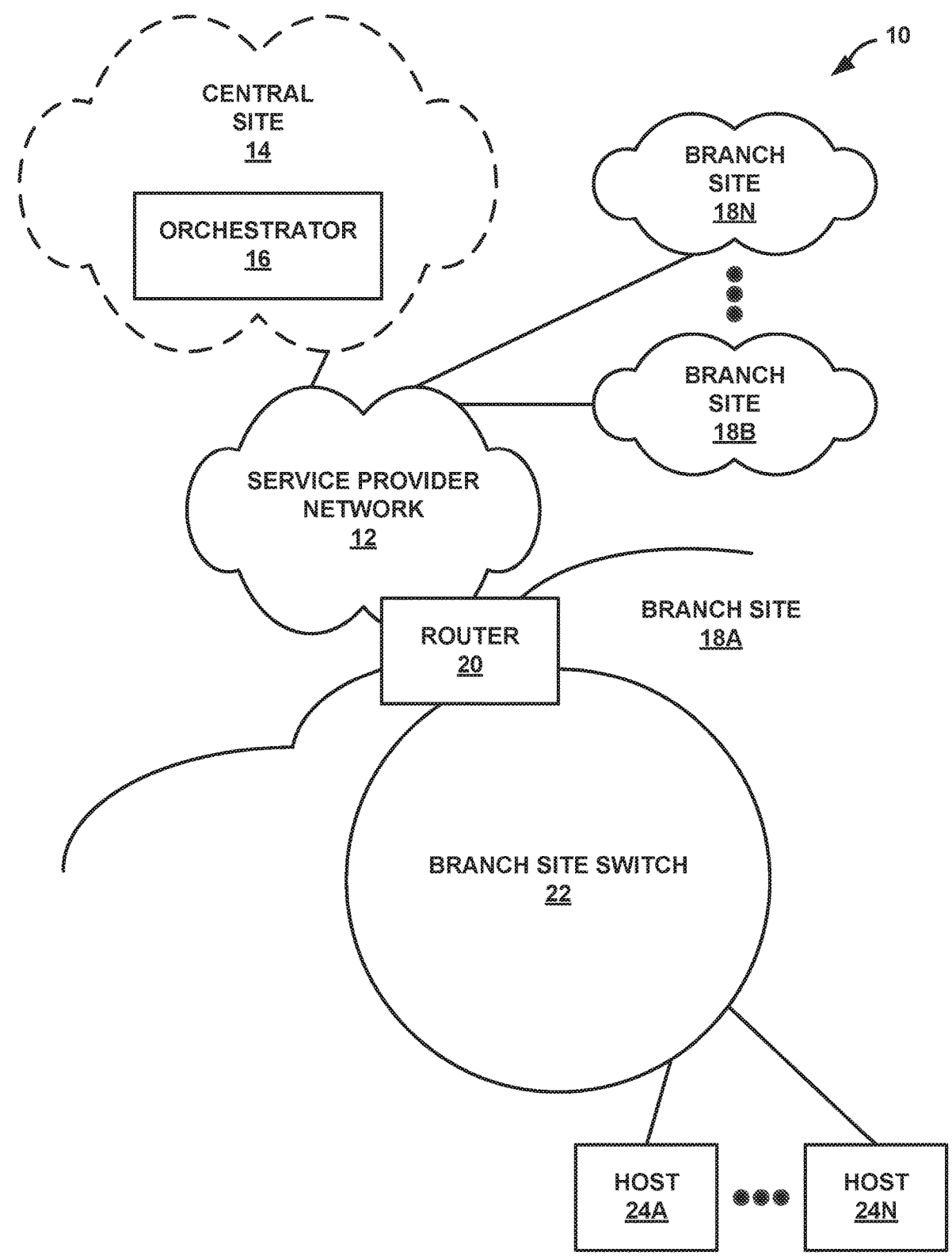
FIG. 1 is a block diagram illustrating an example network which uses a service provider network to connect a central site and branch sites, in accordance with one or more techniques of this disclosure.

FIG. 1 is a block diagram illustrating an example system 10 which uses a service provider network 12 to connect a central site 14 and branch sites 18A-18N (collectively, "branch sites 18"), in accordance with one or more techniques of this disclosure. As illustrated in FIG. 1, central site 14 includes an orchestrator 16 which may be responsible for managing at least some aspects of system 10. Although orchestrator 16 is illustrated as being located in central site 14, in some examples, orchestrator 16 may be located in any of branch sites 18. In examples where orchestrator 16 is located in one of branch sites 18, the respective branch site that includes orchestrator 16 may be referred to as a "central site." Additionally, as illustrated in FIG. 1, branch site 18A includes branch site switch 22 which manages connectivity between hosts or endpoints within system 10, including local hosts 24A-24N (collectively "hosts 24") within branch site 18A as well as hosts included in branch sites 18B-18N. Collectively, central site 14 and branch sites 18 may be referred to herein as sites 14, 18. In some examples, branch sites 18 may be referred to as "branch networks."

Central site 14, in some cases, may be a "central office" which acts as an administrator of system 10 which includes central site 14 and branch sites 18. In some examples, system 10 represents a wide area network (WAN). In some examples, central site 14 includes orchestrator 16 which is configured to manage a connection between sites 14, 18. For example, orchestrator 16 may provision an Internet Protocol (IP) address corresponding to each of sites 14, 18. If an additional branch site 18 is added to system 10, orchestrator 16 may provision an IP address corresponding to the additional branch site 18 and update a topology of system 10 to include the additional branch site 18. Additionally, in some cases, orchestrator 16 may configure the additional branch site 18 such that the additional branch site 18 can exchange information with other sites 14, 18 of system 10.

Branch site 18A, for example, may include branch site switch 22 which is coupled to hosts 24. In some cases, branch site 18A represents a local area network (LAN) or a WAN within the WAN given by system 10. Additionally, in some cases, each branch site of branch sites 18 represents a separate LAN within the WAN given by system 10. Branch site switch 22 may facilitate access of hosts 24 to other branch sites of system 10. For example, branch site switch 22 may connect a host (e.g., host 24A) to other hosts (e.g., hosts 24B-24N) within branch site 18. Additionally, branch site switch 22 may connect host 24A with other hosts (not shown) coupled to other sites 14, 18, via service provider network 12.

Orchestrator 16, in some examples, may manage each of branch sites 18 as a single logical switch. In other words, a branch site (e.g., branch site 18A) may communicate with orchestrator 16 via one management interface. For example, branch site switch 22 of branch site 18A may include an aggregation device and a set of satellite devices (not shown), where the set of satellite devices are coupled to hosts 24. The aggregation device of branch site switch 22 may manage the set of satellite devices, obviating a need for orchestrator 16 to manage the set of satellite devices. In other words, orchestrator 16 registers each branch site switch located in branch sites 18 as a single logical switch. For example, orchestrator 16 may exchange configuration information with branch site switch 22 via a management interface of the aggregation device of branch site switch 22. In some examples, the aggregation device represents a universal customer premises equipment (uCPE) device where Virtual Network Functions (VNFs) are deployed as software applications for various functions (e.g., a firewall function or a router function) on standard x86 servers.

In some examples, an administrator logs in to orchestrator 16, enabling the administrator to access information associated with each of branch sites 18. Orchestrator 16 may display information associated with branch sites 18 on a user interface that is configured to accept user input. Additionally, in some cases, orchestrator 16 may receive user input representing an instruction to be sent to a branch site (e.g., branch site 18A). Subsequently, orchestrator 16 may send the instruction to branch site 18A.

In some examples, the set of satellite devices are not registered with orchestrator 16. For example, orchestrator 16 might not provision an IP address corresponding to each satellite device of the set of satellite devices, and orchestrator 16 might not create any other type of record corresponding to the satellite devices. In this way, a number of satellite devices located within branch site switch 22 might not be recorded by orchestrator 16. In some examples, orchestrator 16 provisions a single IP address corresponding to each respective branch site switch of branch sites 18, and orchestrator 16 does not provision IP addresses corresponding to satellite devices of branch sites 18. If a satellite device is added or removed from branch site switch 22, for example, the aggregation device may track the respective addition or subtraction—without providing orchestrator 16 with information indicating the addition/subtraction. By isolating orchestrator 16 from the management of the satellite devices of branch site switch 22, and by isolating orchestrator 16 from the management of other branch site switches of branch sites 18, system 10 may decrease a likelihood that orchestrator 16 will become overburdened and go offline.

Sites 14, 18 may be geographically separated sites that belong to a single enterprise, such as a university, corporation, business, or other large entity. In some examples, each of branch sites 18 may have a number of users (e.g., employees, students, or customers) within a range between 10 and 100. Each of the sites 14, 18 may include a private network, such as a LAN or a WAN that includes a plurality of hosts, e.g., hosts 24 within branch site 18A. As an example, hosts 24 may include data servers, switches, or customer devices, such as desktop computers, laptop computers, workstations, smartphones, smart televisions, tablet devices, personal digital assistants (PDAs), Internet of Things (IOT) devices, wireless devices, network-ready appliances, file servers, printers, print servers, Voice over Internet Protocol (VoIP) phones, wireless access points, IP cameras, card readers or other devices.

One or more hosts (not shown) within sites 14, 18 may be logically connected to one or more of hosts 24 within branch site 18A across service provider network 12. The hosts within each of the sites 14, 18 may each be included in one or more virtual LANs (VLANs), which are groups of devices on one or more LANs that are configured to communicate as if they are attached to the same wire. Branch site switch 22 may be configured to provide hosts 24 with access to service provider network 12 via router 20, and to provide hosts 24 with connectivity for host-to-host traffic within branch site 18A. Service provider network 12, in turn, provides hosts within central site 14 and branch sites 18B-18N with access to branch site switch 22 within branch site 18A.

Service provider network 12 may be coupled to one or more networks (not shown) administered by other providers, and may thus form part of a large-scale public network infrastructure, e.g., the Internet. Service provider network 12, therefore, may provide hosts or endpoints within sites 14, 18 with access to the Internet. Router 20 may perform Layer 3 routing to route network traffic between branch site switch 22, central site 14, and branch sites 18B-18N using service provider network 12. Service provider network 12 may include a variety of network devices other than router 20, such as other provider edge (PE) routers, core routers, customer edge (CE) routers, and switches.

Although additional network devices are not shown for ease of explanation, system 10 may include additional networks, branch sites, and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 10 are illustrated as being directly coupled, one or more additional network elements may be included along any links between service provider network 12 and sites 14, 18, and any links between branch site switch 22 and hosts 24, such that the network elements of system 10 are not directly coupled.

Although illustrated as a single switch in FIG. 1, branch site switch 22 may include a plurality of network devices, e.g., routers and/or switches. For example, as described above, branch site switch 22 may include a set of access or satellite devices interconnected via one or more aggregation devices. In some examples, the architecture of branch site switch 22 includes a multi-tiered architecture in which two tiers of access or satellite devices and aggregation devices are interconnected to forward data packets between hosts 24 within branch site 18A and from hosts 24 to other hosts within central site 14 and branch sites 18B-18N via service provider network 12. The interconnection between the aggregation device and satellite devices appear in system 10 as a single, port-dense device that is managed using a single IP address.

As described in more detail below with respect to FIG. 2, the aggregation device included in branch site switch 22 is connected to one or more access or satellite devices, and acts as a single point of management for the satellite devices. For example, the aggregation device centrally manages interface configuration for each satellite device interface. The aggregation device may add interfaces through interconnections with the satellite devices to expand the number of available network interfaces. For example, the aggregation device includes cascade ports for sending and receiving control and network traffic from satellite devices. The satellite devices each includes one or more host-facing ports, also referred to as extended ports, that transmit and receive network traffic from hosts 24, and are associated with the cascade ports of the aggregation device. Since the aggregation device manages the interfaces between the satellite devices and the aggregation device is within branch site switch 22, orchestrator 16 might not need to individually log in to each respective satellite device in order to configure ports of the satellite devices. Rather, from the perspective of orchestrator 16, the satellite devices may appear as line cards on branch site switch 22. In other words, branch site switch 22 may be viewed by a user of orchestrator 16 (e.g., an end user) as a chassis switch with multiple line cards, enabling the user to configure interfaces of branch site switch 22 (e.g., interfaces of the apparent line cards that are actually satellite devices) as though branch site switch 22 is indeed a chassis switch with multiple line cards. In some examples, rather than line cards, the satellite devices appear to orchestrator 16 as subsystems. In this manner, the aggregation device (e.g., a uCPE device) provides orchestrator 16 with a central point of management for managing the LAN of branch site 18A, simplifying the management process and allowing more scalability.

In general, the techniques of this disclosure are described with respect to a branch site switch in a network used to provide access between hosts within the network. In other examples, the techniques of the disclosure may be similarly performed within a data center switch included in a data center network used to provide hosts with access to web sites, data, and services housed in a data center.

In some examples, the aggregation device allocates one or more resources (e.g., Quality of Service (QoS) queues, firewalls, etc.) for each of the extended ports of the satellite devices on the cascade ports of the aggregation device. While the resources are provisioned on the cascade ports of the aggregation device, the extended ports of the satellite devices may utilize the resources (i.e., perform the classification, queueing, and scheduling) on the traffic.

Figure 2:
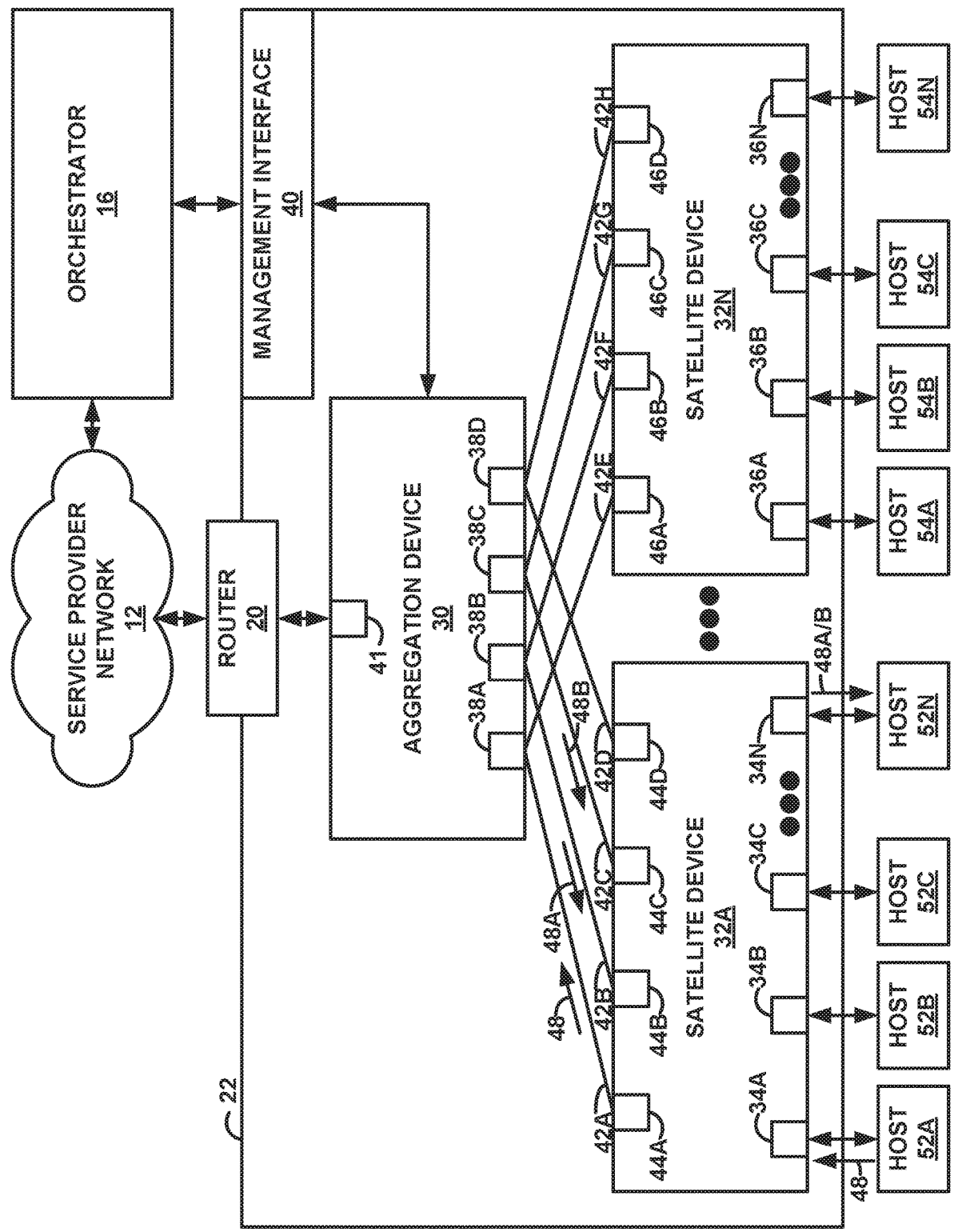
FIG. 2 is a block diagram illustrating the branch site switch of FIG. 1 including an aggregation device, in accordance with one or more techniques of this disclosure.

FIG. 2 is a block diagram illustrating an example of branch site switch 22 including aggregation device 30, in accordance with one or more techniques of this disclosure. The architecture illustrated in FIG. 2 is merely an example and, in other examples, branch site switch 22 may conform to a different architecture.

Satellite devices 32A-32N (collectively, "satellite devices 32") form the access layer of branch site switch 22 and provides hosts with access to the internal switch fabric of branch site switch 22. In the example of FIG. 2, satellite device 32A may provide hosts 52A-52N (collectively, "hosts 52") with access to the internal switch fabric of branch site switch 22, and satellite device 32N may provide hosts 54A-54N (collectively, "hosts 54") with access to the internal switch fabric of branch site switch 22. In other examples, more or fewer hosts may be connected, either multi-homed or singularly homed, to one or more of satellite devices 32. Hosts 52 and hosts 54 (collectively, "hosts 52, 54") may, in some examples, be examples of hosts 24 of FIG. 1. Satellite devices 32 may each provide layer 2, medium access control (MAC) address switching and/or layer 3, IP address switching between the hosts.

The host-facing ports of each of satellite devices 32 are referred to herein as extended ports. For example, satellite device 32A may include extended ports 34A-34N (collectively, "extended ports 34") and satellite device 32N may include extended ports 36A-36N (collectively, "extended ports 36"). Extended ports 34 and 36 (collectively, "extended ports 34, 36") may be capable of transmitting and receiving traffic from hosts 52 and 54, respectively. Extended ports 34, 36 may, in some cases, represent Power over Ethernet (PoE) ports for physically connecting hosts 52, 54 to satellite devices 32. As such, satellite devices 32 may represent hardware-based Ethernet switches for connecting hosts 52, 54 to aggregation device 30 and service provider network 12.

In some examples, it may be beneficial to include Ethernet switches in satellite devices 32 and include a forwarding unit such as a packet forwarding engine (PFE) in aggregation device 30 in order to provide PoE to hosts 52, 54 or connect multi-rate ports. In some examples, up to 40% of bandwidth available to branch site 118A is used by branch site switch 22 and hosts 52, 54. Additionally, security features such as IP Source Guard, dynamic host configuration protocol (DHCP) security, Institute of Electrical and Electronics Engineers (IEEE) 802.1X authentication, Captive portal, VoIP provisioning, and advanced access control list (ACL) options may be applied to satellite devices 32 and extended ports 34, 36. Such security features may, in some cases, be deployed to aggregation device 30 as VNFs. By implementing security features as VNFs, aggregation device 30 may improve a management and orchestration (MANO) efficiency of system 10. Additionally, since satellite devices 32 route packets through aggregation device 30, which includes the security features, it might not be necessary for satellite devices 32 themselves to include such security features, which may expensive to include in satellite devices 32. In this way, it may be possible to cost-effectively connect satellite devices 32 to the LAN which is managed by the aggregation device.

Satellite devices 32 may include uplink ports that are each a physical interface that provides connection to aggregation device 30. For example, uplink ports 44A-44D (collectively, "uplink ports 44") provide connections for satellite device 32A to aggregation device 30, and uplink ports 46A-46D (collectively, "uplink ports 46") provide connections for satellite device 32N to aggregation device 30. Network and control traffic on satellite devices 32 that are transported to aggregation device 30 are sent or received on uplink ports 44 and 46. Uplink ports 44 and 46 may be a 10-gigabit/second (Gbps) small form-factor pluggable (SFP+) interface or a 40-Gbps quad small form-factor pluggable (QSFP+) interface, but may also be any interface on satellite devices 32 that connects satellite devices 32 to aggregation device 30.

Aggregation device 30 may serve as a master switch with respect to satellite devices 32. Aggregation device 30 includes a plurality of cascade ports 38A-38D (collectively, "cascade ports 38") that are physical interfaces on aggregation device 30 that provide connectivity to one or more satellite devices, e.g., satellite devices 32. Aggregation device 30 may configure one or more cascade port connections with each of satellite devices 32 over which control and network traffic is sent and received. For example, cascade ports 38A-38D connect to uplink ports 44A-44D, respectively, on satellite device 32A via links 42A-42D, and cascade ports 38A-38D connect to uplink ports 46A-46D, respectively, on satellite device 32N via links 42E-42H. Although shown for purposes of example with connections between only certain cascade ports 38 and certain uplink ports 42, in some examples, every cascade port 38 may be connected to every uplink port 42. Each of links 42A-42H (collectively, "links 42") may include an interface on each end of the link. The interface on the aggregation device end of the link is a cascade port, and the interface on the satellite device end of the link is an uplink port. Each of cascade ports 38 may be a 10-gigabit/second (Gbps) SFP+ interface or a 40-Gbps QSFP+ interface, but may also be any interface on aggregation device 30 that connects satellite devices 32 to aggregation device 30.

Additionally, aggregation device 30 includes a management interface 40, where management interface 40 is a physical interface on aggregation device 30 that provides connectivity to orchestrator 16. In some examples, management interface 40 may represent the most direct interface to orchestrator 16 within branch site switch 22. Orchestrator 16 may, in some examples, register branch site switch 22 as a single logical switch represented by aggregation device 30. In some examples, orchestrator 16 does not register satellite devices 32 in a network topology. As such, a number of satellite devices 32 connected to aggregation device 30 might not be registered with orchestrator 16.

Aggregation device 30 centrally manages satellite devices 32, therefore eliminating the need for central site 14 to manage satellite devices 32 individually, which reduces the overhead associated with configuring, monitoring, and upgrading satellite devices 32. To facilitate the centralized management, aggregation device 30 may configure connections between cascade ports 38 of aggregation device 30 and satellite devices 32. Each of extended ports 34 of satellite devices 32 may include an identifier, e.g., a flexible physical interface card (PIC) concentrator identifier (FPC ID) that is mapped to one or more of cascade ports 38. As one example, extended port 34A of satellite device 32A may include an FPC ID of 110, and cascade port 38A of aggregation device 30 may include a port ID of xe-0/0/2. To configure a connection between aggregation device 30 and satellite device 32A, aggregation device 30 may map the FPC ID of 110 of extended port 34A to the xe-0/0/2 port ID of cascade port 38A such that extended port 34A is associated with cascade port 38A.

Based on the configured connections, extended ports 34 may appear as ports of sub-systems, such as a additional interfaces of line cards, that can be managed via aggregation device 30. In the example of FIG. 2, aggregation device 30 may handle traffic for extended ports 34A-34N on satellite device 32A and handle traffic for extended ports 36 for satellite device 32N.

Aggregation device 30 provides one or more resources, such as Quality of Service (QoS) queues or firewalls, for use by extended ports 34, 36. As one example, aggregation device 30 may include QoS hardware queues used to facilitate controlled sharing of network bandwidth for forwarding packets. In one example, each of hosts 52 may have a particular priority associated with a service level subscription (i.e., host 52A may have a higher priority to access services, whereas host 52C may have a lower priority to access server). Extended ports 34 of satellite devices 32 may need the QoS hardware queues provisioned on aggregation device 30 to facilitate controlled sharing of network bandwidth for forwarding packets based on the priorities to hosts 52.

In some examples, aggregation device 30 represents a uCPE device where VNFs are spawned as software applications for various functions (e.g., a firewall function or a router function) on standard x86 servers. For example, the VNFs of the uCPE device may run on an operating system hosted by a server (not illustrated in FIG. 2). The operating system of the uCPE may manage a lifecycle of the VNFs, and also provide switching among NIC ports of the uCPE using a software-based data plane (e.g., a forwarding unit). It may be beneficial, in some cases, for aggregation device 30 to be a uCPE device, since uCPE devices provide an efficient interface between hardware (e.g., a PFE) and software components (e.g., VNFs). Additionally, it may be efficient to add and remove VNFs from the uCPE.

In some examples, extended port 34A of satellite device 32A receives packet 48 from host 52A, where packet 48 is destined for host 52N. Traffic sent between aggregation device 30 and satellite devices 32 is sent over a logical path, referred to herein as "E-channel." Satellite device 32A may insert an E-channel tag (ETAG) header to the packet. The ETAG header may include an E-channel identifier (ECID) value that is assigned by aggregation device 30 and identifies the source or destination extended port on satellite devices 32. In the example of FIG. 2, satellite device 32A may insert in packet 48 an ETAG header that carries an ECID value identifying extended port 34A of satellite device 32A as the source extended port.

Satellite device 32A load-balances the packet on one of uplink ports 44A-44D (collectively, "uplink ports 44") to forward packet 48 to aggregation device 30. For example, satellite device 32A may perform a hash algorithm on packet 48, and based on a per-packet hash that is computed using key fields in packet 48, one of the uplink port connections is selected to forward packet 48 to aggregation device 30. In the example of FIG. 2, satellite device 32A may select uplink port 44A to forward packet 48 to aggregation device 30.

Cascade port 38A of aggregation device 30 may receive packet 48 and extract the ECID value identifying extended port 34A from the ETAG header and determine that the packet is sourced from extended port 34A of satellite device 32A. Aggregation device 30 then removes the ETAG header from the packet. Aggregation device 30 performs a lookup for host 52N in its forwarding information and the result of the lookup is extended port 34N of satellite device 32A.

Aggregation device 30 may insert a new ETAG header and ECID value in packet 48 identifying extended port 34N of satellite device 32A as the destination extended port and may forward packet 48 (represented as packet 48A in FIG. 2) through the active cascade port, e.g., cascade port 38B, to uplink port 44B of satellite device 32A. Uplink port 44B of satellite device 32A receives packet 48 and extracts the ECID value from the ETAG header. In this example, satellite device 32A maps the ECID value identifying extended port 34N to extended port 34N and forwards packet 48 to host 52N. As such, branch site switch 22 may route packet 48 from host 52A to host 52N. In cases where an originating host device of a packet and a destination host device of the packet are located within the same branch site 18, the packet may be referred to as a "local packet."

Aggregation device 30 may be configured to register satellite devices 32. In some examples, to register satellite devices 32, aggregation device 30 is configured to provision an IP address corresponding to each satellite device of satellite devices 32. Additionally, in some examples, aggregation device 30 is configured to map satellite devices 32 to a network topology stored in a storage device (not illustrated in FIG. 2) of aggregation device 30, configure satellite devices 32 for exchanging information with aggregation device 30, manage connections between cascade ports 38 and satellite devices 32, or any combination thereof. For example, aggregation device 30 may manage interface configuration for satellite devices 32 which are coupled to aggregation device 30 via cascade ports 38. Using aggregation device 30 to manage the interface configuration for satellite devices 32 may obviate a need for orchestrator 16 to manage the interface connection for the satellite devices 32. For example, orchestrator 16 might not need to reserve public IP addresses as management IP addresses for each of satellite devices 32. As such, orchestrator 16 might not be required to log in to each satellite device 32 separately. Rather, orchestrator 16 may communicate directly with aggregation device 30 via management interface 40, and view satellite devices 32 as line cards on a single logical switch (e.g., branch site switch 22). Because switches are logically represented to orchestrator 16 as sub-systems of branch site switch 22 and orchestrator 16 need not interface directly with the switches, it may be simpler, from the perspective of orchestrator 16, to add or remove switches (represented as satellite devices) to or from branch site switch 22.

In some examples, aggregation device 30 includes a forwarding unit (not illustrated in FIG. 2) configured to route packets within branch site 30A, and forward packets to central site 14, branch sites 18B-18N, or any combination thereof. Aggregation device 30 may forward packets on behalf of satellite devices 32A, eliminating a need for a satellite device to forward packets between a source host device and a destination host device that are both coupled to the satellite device. For example, satellite device 32A may receive a packet from a first host device (e.g., host 52A) that is destined for a second host device (e.g., host 52N), where both the first host device and the second host device are coupled to satellite device 32A. Satellite device 32A may forward the packet to aggregation device 30, and the forwarding unit of aggregation device 30 may in turn route the packet back to satellite device 32A. Subsequently, satellite device 32A may forward the packet to host 52N, the destination host device. Additionally, in some examples, the forwarding unit may be configured to receive a packet from a first host device (e.g., host 52A) that is destined for a second host device (e.g., host device 54N), where both the first host device and the second host device are coupled to different satellite devices within branch site 18A (e.g., satellite device 32A and satellite device 32N, respectively).

When aggregation device 30 receives a packet destined for a host device within branch site 18A (e.g., hosts 52, 54), aggregation device 30 is configured to determine, based on a header of the packet, a cascade port of cascade ports 38 corresponding to a satellite device 32 coupled to the host device. Subsequently, aggregation device 30 may forward the packet through the cascade port 38 to the host device. In some examples, the host device is coupled to the satellite device 32 by an extended port (e.g., extended ports 34, 36). In some examples, the extended port is a PoE port. In some cases, to determine the correct cascade port 38 for forwarding the packet to the destination host device, the forwarding unit is configured to: determine the cascade port assigned to the extended port coupled to the destination host device and forward the packet to the destination device via the extended port coupled to the destination host device.

In some examples, a set of VNFs are provisioned in aggregation device 30. The set of VNFs may be software models each representing a virtualized model of computer hardware, and the set of VNFs may execute tasks (e.g., security tasks and packet forwarding tasks) based on the respective virtualized models of computer hardware. In some examples, aggregation device 30 receives a packet, from a host device of branch site 18A e.g., hosts 52, 54), that is destined for a device outside of branch site 18A. In such examples, aggregation device 30 is configured to forward the packet to the set of VNFs for processing, and subsequently forward the processed packet to the WAN (e.g., central site 14, branch sites 18B-18N, or any combination thereof) through WAN uplink port 41 and router 20. In some examples, the set of VNFs may include a port extension bridge function (also referred to as a port extension service), which may assist in discovering satellite devices 32 and routing packets between satellite devices 32 via aggregation device 30. The VNFs in some cases, may form a service chain for processing packets, and the port extension service may be a VNF in the service chain.

Figure 3:
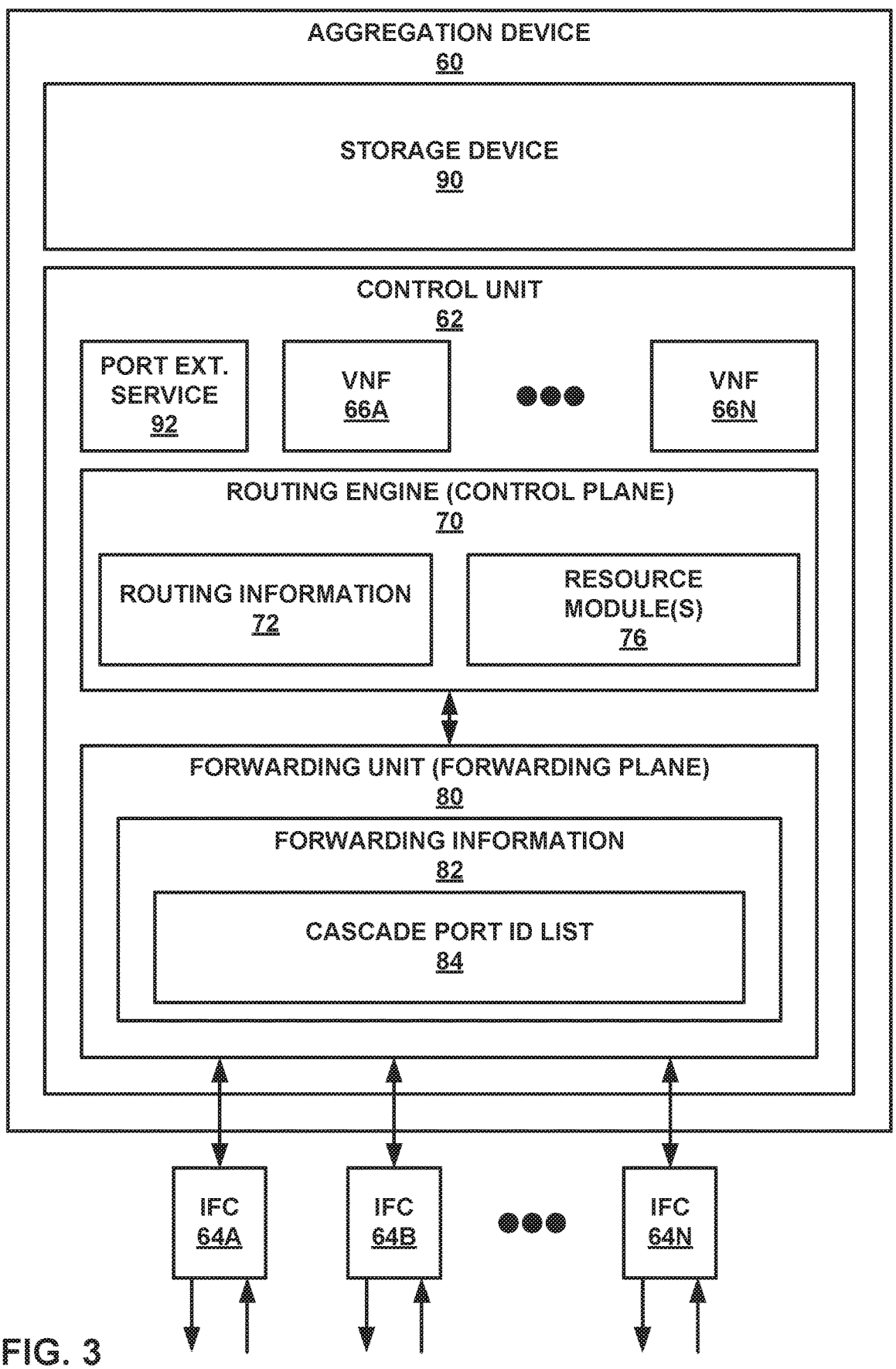
FIG. 3 is a block diagram illustrating an example of an aggregation device within a branch site switch, such the aggregation device from FIGS. 1 and 2, in accordance with one or more techniques of this disclosure.

FIG. 3 is a block diagram illustrating an example of an aggregation device 60 within a branch site switch, such as aggregation device 30 from FIGS. 1 and 2, in accordance with one or more techniques of this disclosure. Aggregation device 60 may include a network device, such as a router and/or a switch. Aggregation device 60 may be configured to operate substantially similar to aggregation device 30 from FIG. 2.

In the illustrated example of FIG. 3, aggregation device 60 includes a control unit 62 that provides control plane functionality for the network device. Control unit 62 may include a routing component 70 (e.g., a routing engine) coupled to a forwarding unit 80. Aggregation device 60 includes interface cards 64A-64N (collectively, "IFCs 64") that receive packets via inbound links and send packets via outbound links. IFCs 64 typically have one or more physical network interface ports (e.g., cascade ports 38 of FIG. 2). Additionally, control unit 62 may include virtualized network functions (VNFs) 66A-66N (collectively, "VNFs 66"). VNFs 66 may be software models each representing a virtualized model of computer hardware, and the VNFs 66 may execute tasks (e.g., security tasks and packet forwarding tasks) based on the respective virtualized models of computer hardware. In some examples, aggregation device 30 receives a packet, from a host device of branch site 18A (e.g., hosts 52, 54), that is destined for a device outside of branch site 18A. In such examples, aggregation device 30 is configured to forward the packet to VNFs 66 for processing, and subsequently forward the processed packet to the WAN (e.g., central site 14, branch sites 18B-18N, or any combination thereof) through WAN uplink port 41 and router 20.

In some examples, aggregation device 60 implements the IEEE 802.1BR standard as a VNF, such as by port extension service 92. In this way, aggregation device 60 may represent access switches as satellite devices 32, where satellite devices 32 include extended ports 34, 36 that, in some examples, represent PoE ports. By implementing IEEE 802.1BR as a VNF in a VNF service chain, aggregation device 60 may improve a MANO efficiency of the system, obviating a need for orchestrator 16 to implement IEEE 802.1BR. In this way, from the perspective of orchestrator 16, branch site switch 22 may represent a single logical switch with PoE capabilities. Additionally, or alternatively, in some cases, VNFs 66 may implement other protocols or standards such as IEEE 802.1X authentication, IP Source Guard, DHCP security, Captive Portal, VoIP provisioning, advanced ACL, or any combination thereof.

In some cases, from the perspective of orchestrator 16, satellite devices 32 appear as line cards on a single logical switch (e.g., branch site switch 22). In some examples, port extension service 92 may "discover" satellite devices 32, such as by using a discovery protocol, and provide orchestrator 16 with data that portrays satellite devices 32 as line cards to orchestrator 16. In this way, if an additional satellite device 32 is added to branch site switch 22, port extension service 92 may discover the existence of the additional satellite device 32 and report the existence of respective additional line cards to orchestrator 16. Orchestrator 16 may then configure ports (e.g., extended ports 34, 36) of satellite devices 32 as ports on a line card. In other words, orchestrator 16 may output instructions to aggregation device 30 via management interface 40, where the instructions cause aggregation device 30 to configure the ports of satellite devices 32, such as by a communication synchronization protocol for communicating with the satellite devices 32.

Routing component 70 provides an operating environment for various protocols (not shown) that execute at different layers of a network stack. Routing component 70 is responsible for the maintenance of routing information 72 to reflect the current topology of a network and other network entities to which aggregation device 60 is connected. In particular, routing protocols periodically update routing information 72 to accurately reflect the topology of the network and other entities based on routing protocol messages received by aggregation device 60.

The protocols may be software processes executing on one or more processors. For example, routing component 70 may include bridge port extension protocols, such as IEEE 802.1BR. Routing component 70 may also include network protocols that operate at a network layer of the network stack. In the example of FIG. 3, network protocols may include one or more control and routing protocols such as border gateway protocol (BGP), internal gateway protocol (IGP), label distribution protocol (LDP) and/or resource reservation protocol (RSVP). In some examples, the IGP may include the open shortest path first (OSPF) protocol or the intermediate system-to-intermediate system (IS-IS) protocol. Routing component 70 also may include one or more daemons that include user-level processes that run network management software, execute routing protocols to communicate with peer routers or switches, maintain and update one or more routing tables, and create one or more forwarding tables for installation to forwarding unit 80, among other functions.

Routing information 72 may include, for example, route data that describes various routes within the network, and corresponding next hop data indicating appropriate neighboring devices within the network for each of the routes. Aggregation device 60 updates routing information 72 based on received advertisements to accurately reflect the topology of the network.

Based on routing information 72, routing component 70 generates forwarding information 82 and installs forwarding data structures (e.g., cascade port identifier list 84) into forwarding information 82 within forwarding unit 80 in the forwarding plane. Forwarding information 82 associates network destinations with specific next hops and corresponding interface ports within the forwarding plane.

Routing component 70 may include one or more resource modules 76 for configuring resources for extended ports and uplink ports on satellite devices interconnected to aggregation device 60. Resource modules 76 may include a scheduler module for configuring Quality of Service (QoS) policies, firewall module for configuring firewall policies, or other modules for configuring a resource for network devices.

Forwarding unit 80 represents hardware and logic functions that provide high-speed forwarding of network traffic. In some examples, forwarding unit 80 may be implemented as a programmable forwarding plane. Forwarding unit 80 may include a set of one or more forwarding chips programmed with forwarding information that maps network destinations with specific next hops and the corresponding output interface ports. In the example of FIG. 3, forwarding unit 80 includes forwarding information 82. In accordance with routing information 72, forwarding unit 80 maintains forwarding information 82 that associates network destinations with specific next hops and corresponding interface ports (e.g., extended ports 34). For example, routing component 70 analyzes routing information 72 and generates forwarding information 82 in accordance with routing information 72. Forwarding information 82 may be maintained in the form of one or more tables, link lists, radix trees, databases, flat files, or any other data structures.

Forwarding information 82 may, in sonic examples, include a cascade port identifier list 84 having a list of unicast next hops. Cascade port identifier list 84 may include a list of cascade port identifiers associated with cascade ports included in IFCs 64 coupled to aggregation device 60. Cascade port identifier list 84 may represent an identifier of any of cascade ports 38 of FIG. 2.

Although not shown in FIG. 3, forwarding unit 80 may include a central processing unit (CPU), memory and one or more programmable packet-forwarding application-specific integrated circuits (ASICs).

The architecture of aggregation device 60 illustrated in FIG. 3 is shown for example purposes only. The disclosure is not limited to this architecture. In other examples, aggregation device 60 may be configured in a variety of ways. In one example, some of the functionally of routing component 70 and forwarding unit 80 may be distributed within IFCs 64.

Elements of control unit 62 may be implemented solely in software, or hardware, or may be implemented as combinations of software, hardware, or firmware. For example, control unit 62 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 62 may include executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of aggregation device 60, e.g., protocols. Control unit 62, in some examples, retrieves and executes the instructions from memory for these aspects.

Storage device 90 may be configured to store information within aggregation device 60 during operation. Storage device 90 may include a computer-readable storage medium or computer-readable storage device. In some examples, storage device 90 includes one or more of a short-term memory or a long-term memory. Storage device 90 may include, for example, RAM, DRAM, SRAM, magnetic discs, optical discs, flash memories, or forms of EPROM or EEPROM. In some examples, storage device 90 is used to store data indicative of instructions for execution by processing circuitry (not illustrated) of aggregation device 60. Storage device 90 may be used by software or applications running on aggregation device 60 to temporarily store information during program execution.

Additional examples regarding the aggregation device are described in U.S. patent application Ser. No. 15/933,902, entitled "TARGETED SELECTION OF CASCADE PORTS," filed Mar. 23, 2018, and U.S. patent application Ser. No. 15/398,366, entitled "AUTOMATIC ICCP PROVISIONING AND VLAN PROVISIONING ON AN INTER-CHASSIS LINK IN A MC-LAG," filed Jan. 4, 2017, the entire contents of which are incorporated by reference herein.

Figure 4:
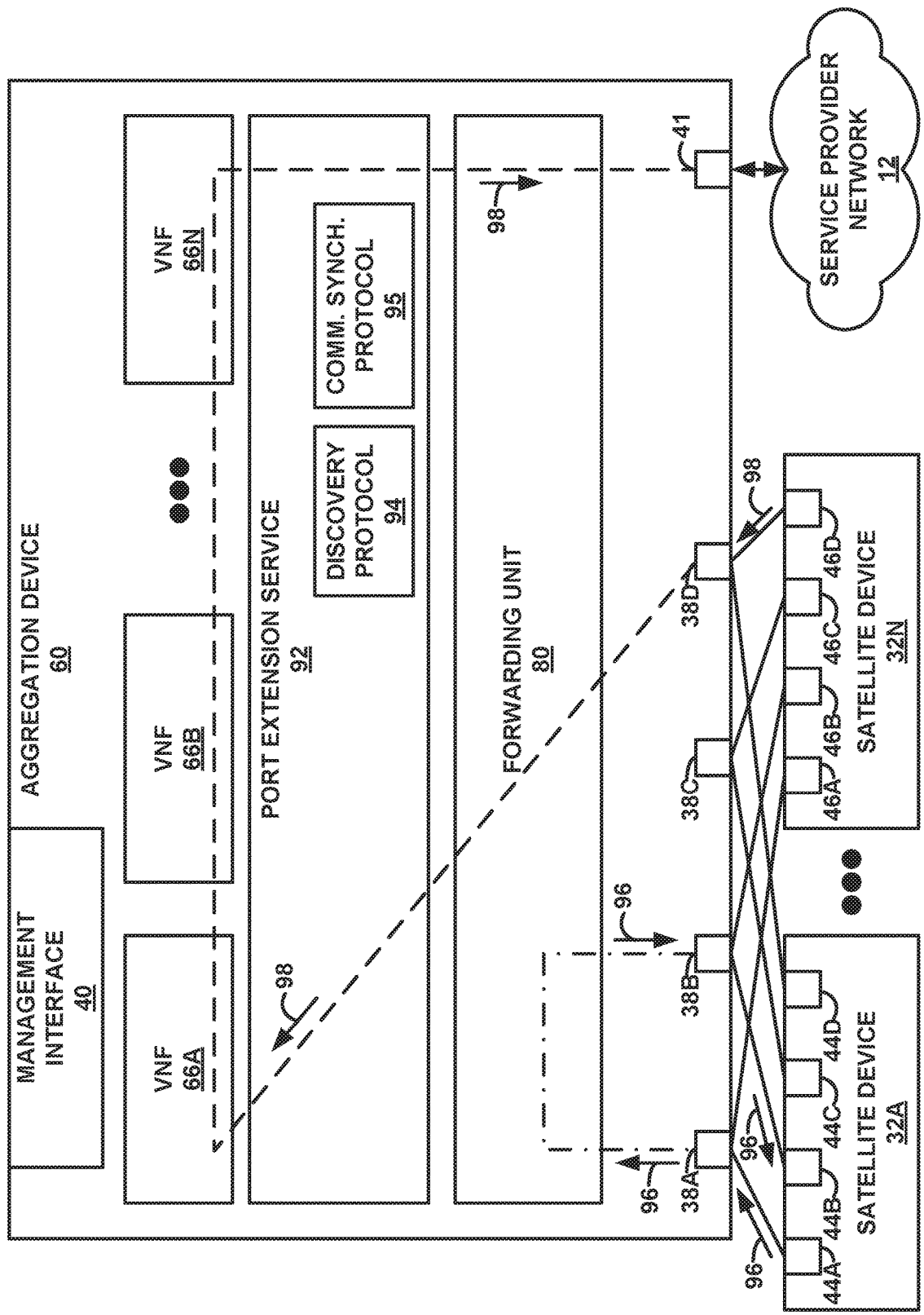
FIG. 4 is a block diagram illustrating a path of an example first packet and a path of an example second packet, in accordance with one or more techniques of this disclosure.

FIG. 4 is a block diagram illustrating a path of an example first packet 96 and a path of an example second packet 98, in accordance with one or more techniques of this disclosure. FIG. 4 includes service provider network 12, satellite devices 32, and aggregation device 60, which may be an example of aggregation device 30 of FIGS. 1 and 2. In the example illustrated in FIG. 4, aggregation device 60 may include VNFs 66, forwarding unit 80, and port extension service 92.

Aggregation device 60 may forward packets received from satellite devices 32. In this way, aggregation device 60 may eliminate a need for satellite devices 32 to themselves route packets between host devices. For example, packets may be tunneled from satellite devices 32 to aggregation device 60, such as in accordance with the IEEE 802.1BR standard, for example. Such tunneling may be facilitated by port extension service 92, in some examples. For example, port extension service 92 may provide NFV functionality that allows aggregation device 60 to decapsulate the packet and determine where to send the packet (e.g., on for further VNF service chain application, or to forwarding unit 80 for outputting via one of ports 38, 41. In some examples, port extension service 92 is provided as a VNF within aggregation device 60. In the example of FIG. 4, Port extension service 92 may be separate from VNFs 66.

In some examples, port extension service 92 cooperates with forwarding unit 80 to forward a packet (e.g., first packet 96) originating from a host device coupled to a satellite device (e.g., satellite device 32A) within branch site 18A, where first packet 96 is destined for a host device that is also coupled to a satellite device within branch site 18A. For example, forwarding unit 80 may receive first packet 96 via uplink port 44A and cascade port 38A. Forwarding unit 80 may identify, based on a header of first packet 96, cascade port 38B, where cascade port 38B corresponds to an extended port of satellite device 32A that is coupled to host device that first packet 96 is destined for. In this manner, forwarding unit 80 provides LAN-to-LAN switching. An example of such forwarding (switching) may be sending packets from a laptop to a printer, for example. Although shown for purposes of example as being sent through forwarding unit 80 without application of VNFs 66 or port extension service 92, in some examples such LAN-to-LAN switching may include application of VNFs 66 and/or port extension service 92.

Additionally, in some examples, aggregation device 60 is configured to forward a packet (e.g., second packet 98) from an originating host device coupled to a satellite device (e.g., satellite device 32N) within branch site 18A, where second packet 98 is destined for a device outside of branch site 18A. For example, forwarding unit 80 may receive second packet 98 via uplink port 46D and cascade port 38D. Port extension service 92 may decapsulate the packet (e.g., by removing an outer tunnel header), and cooperates with forwarding unit 80 to determine what should happen to the packet next. For example, based on an inner header of second packet 98, forwarding unit 80 may determine that second packet 98 is destined for a device outside of branch site 18A. Subsequently, forwarding unit 80 may forward the packet to VNFs 66 for processing, and forward the processed packet to service provider network 12 via WAN uplink port 41.

Port extension service 92 may use discovery protocol 94 (e.g., a link layer discovery protocol (LLDP)) for discovering satellite devices, such as when a new switch is added. Discovery protocol 94 may also detect when a switch is removed. Port extension service 92 accordingly adds or removes a new switch (e.g., an access switch) to or from the cluster of aggregation device 60, e.g., to a cluster of branch site switch 22. Port extension service 92 may provision IP addresses corresponding to each satellite device of satellite devices 32. For example, when an additional satellite device is added to branch site switch 22, discovery protocol 94 may detect the additional satellite device and port extension service 92 may provision an additional IP address corresponding to the additional satellite device. In response to detecting that a switch has been added, port extension service 92 causes management interface 40 to communicate the addition of a logical sub-system representing the added switch. Additionally, in response to detecting that a switch is removed, port extension service 92 causes management interface 40 to communicate the removal of the logical sub-system representing the removed switch. Port extension service 92, in some cases, may represent the sub-systems as line cards on a single logical switch (e.g., branch site switch 22). In such examples, to configure the satellite device of the set of satellite devices, aggregation device 30 may be configured to restructure the configuration information such that the configuration information defines a second data structure referencing aggregation device 30 and the satellite devices 32. In other words, when representing satellite devices 32 as sub-systems, port extension service 92 may be configured to "translate" the representation of branch site switch 22 such that branch site switch 22 appears as a single logical switch having sub systems (e.g., representations of satellite devices 32).

Port extension service 92 may use communication synchronization protocol 95 (CSP) for configuring the satellite devices. In some examples, a CSP such as a TCP-based remote procedure call (RCP) may be used. For example, uCPE commands may be sent to satellite devices using JSON on top of a TCP-based connection to push the commands down to satellite devices. The satellite device receives the command and programs its ASICs accordingly.

In this manner, managed LAN functionality can be provided as a service, and may be offered as a service to providers using any switch vendor (including multi-vendor deployments), and the LAN can be managed via a VNF in a service chain. This converges the functions of managing the WAN and the LAN by the aggregation device (e.g., uCPE). In addition, because the forwarding function is performed by aggregation device 60 on behalf of each of the satellite devices 32, the administrator of branch site switch 22 can centrally modify the forwarding plane of branch site switch 22 by configuring only the forwarding plane of aggregation device 60, rather than having to separately log in and configure forwarding planes of individual switches/satellite devices. In addition, switches that may not support particular forwarding functionality can be used, because the switches gain the benefit of the richer forwarding plane provided by aggregation device 60. This allows for increased network scalability and deployment of larger scale networks without a corresponding increase in administrative burden, as well as potentially lower costs. It may be beneficial for aggregation device 60 to include VNFs 66 and port extension service 92, enabling the aggregation device to implement one or more security features. For example, since satellite devices 32 route packets through aggregation device 60, which includes a rich set of access and control features provided by VNFs 66 and port extension service 92, it might not be necessary for satellite devices 32 to include such access and control features, which may expensive to include satellite devices 32. In this way, it may be possible to cost-effectively add or remove large numbers of satellite devices to the LAN which is managed via aggregation device 60.

The techniques of this disclosure provide a port extension service as a VNF, including tunneling functionality (e.g., 802.1BR) for port extension, for branch sites where uCPE devices are used, and represent the access switches as the satellite devices in the managed. LAN, and the POE capable ports as "extended ports" of the uCPE device itself, after which the general-purpose server logically becomes a massive PoE-capable switch.

Figure 5:
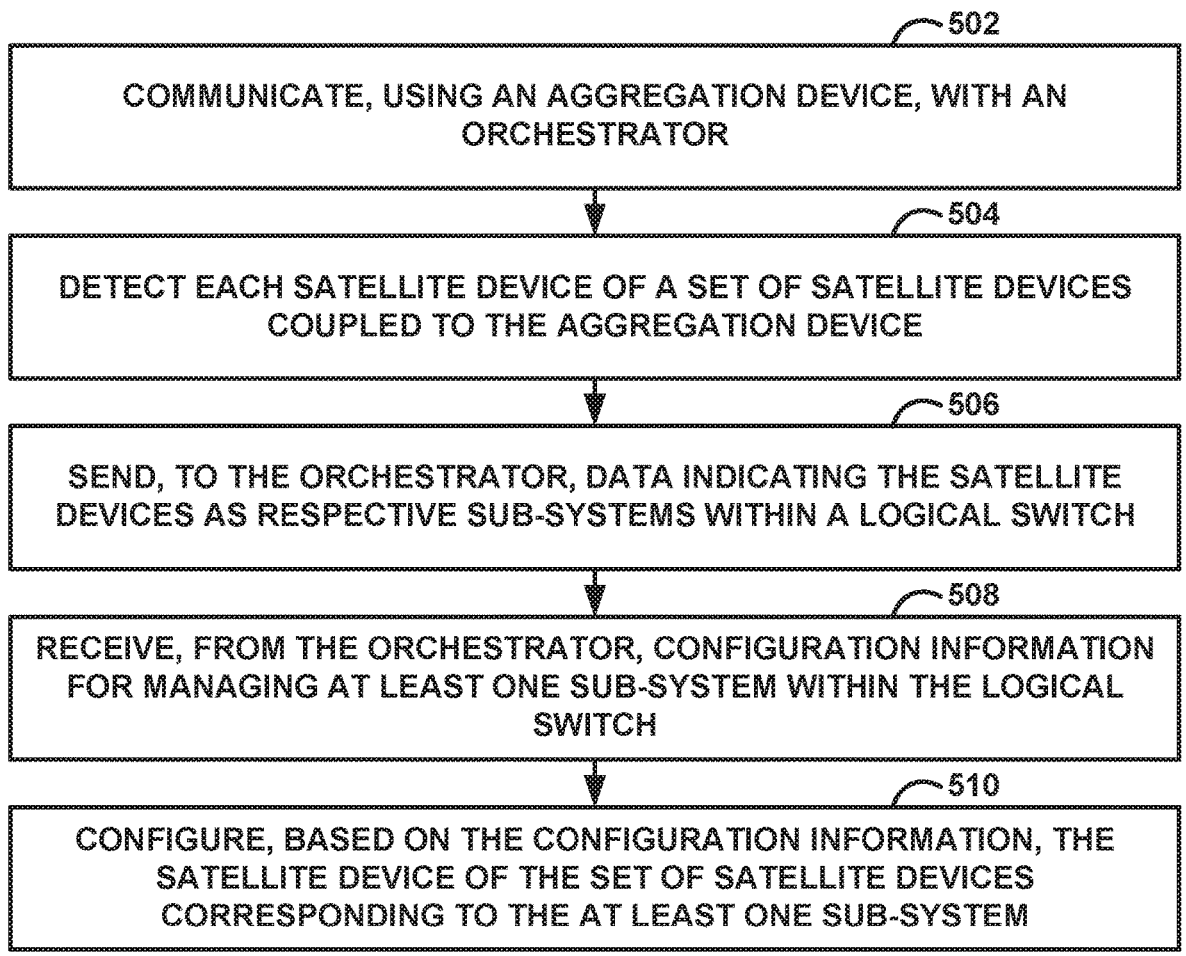
FIG. 5 is a flow diagram illustrating an example operation for managing a branch site of FIG. 1, in accordance with one or more techniques of this disclosure.

FIG. 5 is a flow diagram illustrating an example operation for managing branch site 18A of system 10, in accordance with one or more techniques of this disclosure. For purposes of example, FIG. 5 is described with respect to orchestrator 16, branch site 18A, and branch site switch 22 of FIGS. 1-4. However, the techniques of FIG. 5 may be performed by different additional or alternative systems and devices.

Branch site 18A, in some cases, may be a single branch site of a plurality of branch sites 18 that are managed by orchestrator 16 of central site 14. Central site 14 and branch sites 18 may be geographically separated sites that belong to a single enterprise, such as a university, corporation, business, or other large entity. In this way, sites 14, 18 may collectively represent a WAN, where each of branch sites 18 represent a respective LAN. While orchestrator 16 may be configured to manage branch sites 18, orchestrator 16 may manage each branch site of branch sites 18. For example, orchestrator 16 may manage branch site 18A using branch site switch 22, which represents a single logical switch from the perspective of orchestrator 16.

In the example operation of FIG. 5, aggregation device 30 is configured to communicate with orchestrator 16 (510). For example, aggregation device 30 is configured to communicate with orchestrator 16 via management interface 40. In some cases, aggregation device 30 may send information to orchestrator 16. In other examples, aggregation device 30 may receive information from orchestrator 16. Management interface 40 may, in some cases, be the only interface by which orchestrator 16 can communicate with aggregation device 30. In this way, aggregation device 30 may serve as a master switch of branch site 18A, since aggregation device 30 processes and distributes to the satellite devices data received from orchestrator 16 via management interface 40. Orchestrator 16 may be coupled to satellite devices 32 via cascade ports 38, where the satellite devices 32 provide switching functionality.

Aggregation device 30 detects each satellite device of satellite devices 32 which are coupled to aggregation device 30 (504). In some examples, to detect each satellite device, aggregation device 30 uses port extension service 92. Port extension service 92 may represent a VNF executing on aggregation device 30 that includes a discovery protocol 94 (e.g., an LLDP) configured to identify satellite devices 32 and create a representation of satellite devices 32 relative to aggregation device 30. For example, discovery protocol 94 may identify each connection between satellite devices 32 and cascade ports 38. In turn, port extension service 92 may create a representation of satellite devices 32 as sub-systems within a logical switch. In this way, the logical switch may be a representation of branch site switch 22 including the sub-systems corresponding to satellite devices 32. Additionally, port extension service 92 may provision IP addresses corresponding to each satellite device of satellite devices 32.

Aggregation device 30 sends data to orchestrator 16, the data indicating satellite devices 32 as respective sub-systems within a logical switch (506). In some examples, the data represents the sub-systems as line cards connected to the logical switch. Since the logical switch modelled by the data may represent branch site switch 22, orchestrator 16 and an administrator may view branch site switch 22 as a single logical switch, even though branch site switch 22 includes several physical switching devices (i.e., aggregation device 30 and each of satellite devices 32). Representing branch site switch 22 as a single logical switch may improve a MANO efficiency because in this way, an administrator is only required to manage one logical switch per branch site versus having to manage each satellite device independently. Additionally, because satellite devices 32 are modelled as sub-systems within the logical switch in the data that is available to orchestrator 16, orchestrator 16 may receive user input representing instructions for configuring satellite devices 32 in the context of the sub-systems that represent satellite devices 32. For example, aggregation device 30 may receive, from orchestrator 16, configuration information for managing at least one sub-system within the logical switch (508).

After receiving the configuration information, aggregation device 30 configures, based on the configuration information, the satellite device of satellite devices 32 corresponding to the at least one sub-system (510). In some examples, the configuration information may define a first data structure representing a LAN including the logical switch and the at least one sub-system. In such examples, to configure the satellite device of the set of satellite devices, aggregation device 30 may be configured to restructure the configuration information such that the configuration information defines a second data structure referencing aggregation device 30 and the satellite devices 32. In other words, aggregation device 30 may be configured to "translate" the configuration information such that aggregation device 30 is able to carry out an instruction referencing the at least on sub-system by configuring the respective satellite device 32 based on the configuration information. In some examples, while translating the configuration information, aggregation device 30 may perform management tasks that are not required of orchestrator 16, such as provisioning IP addresses for at least one of satellite devices 32.

In some cases, aggregation device 30 may configure, based on the configuration information, a set of connections between the set of satellite devices and the aggregation device. For example, aggregation device 30 may map, for each connection of the set of connections, an extended port 34, 36 of a respective satellite device 32 to a cascade port 38 of aggregation device 30. Subsequently, aggregation device 30 may establish the set of connections, enabling information to pass through each connection of the set of connections between aggregation device 30 and the respective satellite device 32.

Additionally, aggregation device 30 may facilitate the addition or removal of additional satellite devices to or from branch site switch 22. For example, aggregation device 30 may detect, using port extension service 92, an additional satellite device not included in satellite devices 32. Aggregation device 30 may send, to orchestrator 16, data indicating the additional satellite device as an additional sub-system within the logical switch. Subsequently, aggregation device 30 may receive, from orchestrator 16, additional configuration information for managing the additional sub-system within the logical switch. Aggregation device 30 may configure, by the port extension service based on the additional configuration information, the additional satellite device corresponding to the additional sub-system.

Figure 6:
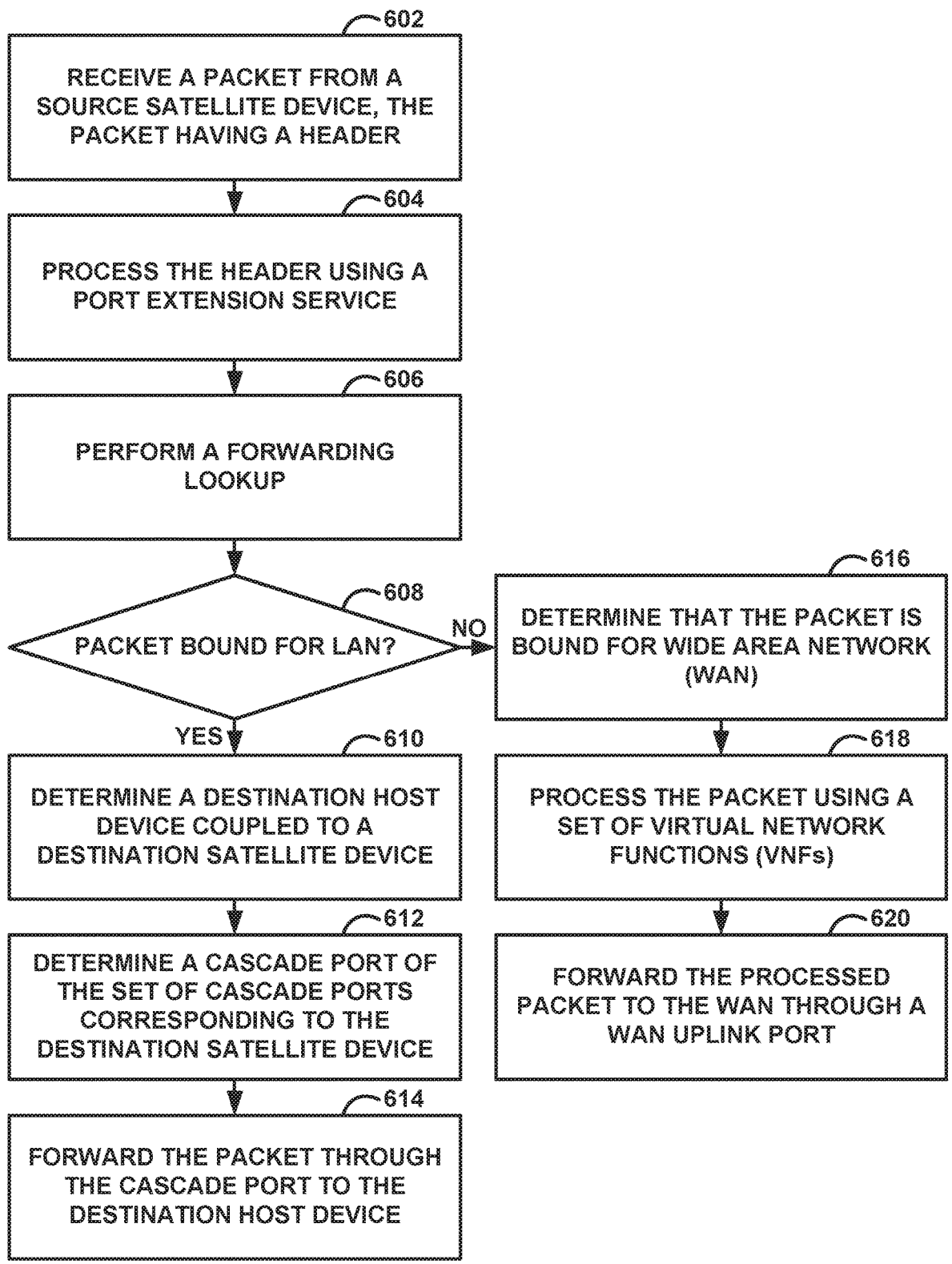
FIG. 6 is a flow diagram illustrating an example operation for forwarding packets using an aggregation device of FIGS. 2-4, in accordance with one or more techniques of this disclosure.

FIG. 6 is a flow diagram illustrating an example operation for forwarding packets using aggregation device 30, in accordance with one or more techniques of this disclosure. For purposes of example, FIG. 6 is described with respect to central site 14, branch sites 18, branch site switch 22, aggregation device 30, satellite devices 32, and hosts 24, 52, and 54 of FIGS. 1-4. However, the techniques of FIG. 6 may be performed by different additional or alternative systems and devices.

Aggregation device 30 may be configured to route network traffic (e.g., packets) within branch site 18A and route network traffic to a destination outside of branch site 18A (e.g., the WAN). In this way, branch site switch 22 may operate using the configuration that is established by orchestrator 16 based on a representation of branch site switch 22 as a single logical switch having at least one sub-system. Aggregation device 30 may, in some cases, receive network traffic from satellite devices 32. In some cases, the example operation of FIG. 6 follows after the example operation of FIG. 5.

In the example operation of FIG. 6, aggregation device 30 receives a packet from a source satellite device, the packet having a header (602). In some examples, the source satellite device is satellite device 32A which is coupled to a source host device (e.g., host 52A). For example, satellite device 32A may receive the packet from source host 52A, which is coupled to extended port 34A of satellite device 32A and forward the packet to aggregation device 30 via uplink port 44A. In some examples, the header includes an "inner header," which is represented by an ETAG header. Additionally, in some examples, the packet includes a tunnel header which represents an "outer header." Aggregation device processes the header using port extension service 92 (604). In some cases, to process the packet, port extension service 92 may remove the outer header of the packet and cooperate with forwarding unit 80 to determine a next destination of the packet based on the inner header.

Aggregation device 30 performs a forwarding lookup (606) to determine the next destination of the packet. For example, aggregation device 30 may perform the forwarding lookup to determine if the packet is bound for the LAN (608) (e.g., if the next destination of the packet is one of satellite devices 32 coupled to aggregation device 30) or if the packet is bound for the WAN (e.g., if the next destination of the packet is WAN uplink port 41). To perform the forwarding lookup in order to determine if the packet is bound for the LAN, port extension service 92 and/or forwarding unit 80 may read the inner header (e.g., the ETAG header) of the packet and identify the destination of the packet. For example, port extension service 92 may determine whether the packet is bound for a destination host device that is coupled to a satellite device within branch site switch 22. In other words, port extension service 92 may determine whether the packet is bound for a destination host device within branch site 18A.

If aggregation device 30 determines that the packet is bound for the LAN ("YES" branch of block 608), aggregation device 30 determines, from the inner header of the packet, a destination host device coupled to a destination satellite device (610). For example, aggregation device 30 may determine that the packet is bound for host 52B coupled to satellite device 32A. Aggregation device 30 may use port extension service 92 to read the inner header of the packet and identify host 52B as the destination host device and identify satellite device 32A as the destination satellite device coupled to host 52B. Subsequently, aggregation device 30 may determine a cascade port of cascade ports 38 corresponding to the destination satellite device (612). In some examples, aggregation device 30 may determine the cascade port using forwarding unit 80 and/or port extension service 92. The destination host device may be coupled to the destination satellite device by an extended port. For example, host 52B is coupled to satellite device 32A by extended port 34B. In this way, and to determine the respective cascade port, aggregation device 30 may determine, using forwarding unit 80, the cascade port assigned to the extended port which is coupled to the destination host device 52B. Aggregation device 30 forwards the packet through the cascade port to the destination host device (e.g., host 52B) (614).

If aggregation device 30 determines that the packet is not bound for the LAN ("NO" branch of block 608), aggregation device 30 determines that the packet is bound for the WAN (616). Subsequently, aggregation device 30 may process the packet using VNFs 66 (618). Additionally, in some examples, aggregation device 30 may process the packet using port extension service 92. VNFs 66 may be software models each representing a virtualized model of computer hardware, and the VNFs 66 may execute tasks (e.g., security tasks and packet forwarding tasks) based on the respective virtualized models of computer hardware. For example, VNFs 66 may implement protocols or standards such as IEEE 802.1X authentication, IEEE 802.1BR, IP Source Guard, DHCP security, Captive Portal, VoIP provisioning, advanced ACL, or any combination thereof. After the packet is processed using VNFs, aggregation device 30 may forward the processed packet to the WAN through WAN uplink port 41 (620).

Figure 7:
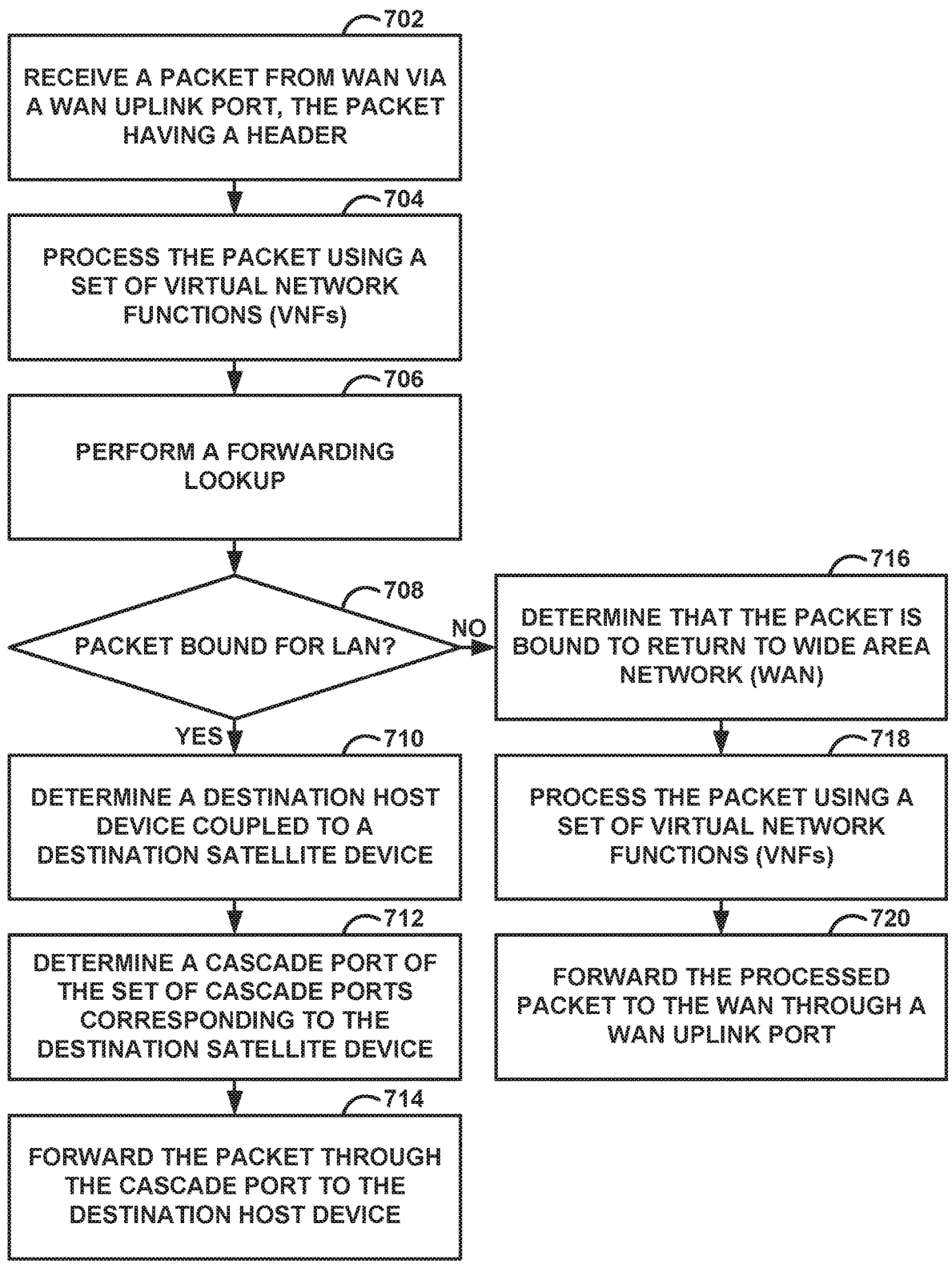
FIG. 7 is a flow diagram illustrating another example operation for forwarding packets using the aggregation device of FIGS. 2-4, in accordance with one or more techniques of this disclosure.

FIG. 7 is a flow diagram illustrating another example operation for forwarding packets using aggregation device 30, in accordance with one or more techniques of this disclosure. For purposes of example, FIG. 7 is described with respect to central site 14, branch sites 18, branch site switch 22, aggregation device 30, satellite devices 32, and hosts 24, 52, and 54 of FIGS. 1-4. However, the techniques of FIG. 7 may be performed by different additional or alternative systems and devices.

Aggregation device 30 may be configured to route network traffic (e.g., packets) within branch site 18A and route network traffic to a destination outside of branch site 18A (e.g., the WAN). In this way, branch site switch 22 may operate using the configuration that is established by orchestrator 16 based on a representation of branch site switch 22 as a single logical switch having at least one sub-system. Aggregation device 30 may, in sonic cases, receive network traffic from the WAN. In some cases, the example operation of FIG. 7 follows after the example operation of FIG. 5.

In the example operation of FIG. 7, aggregation device 30 receives a packet from the WAN via WAN uplink port 41, the packet having a header (702). In some examples, the packet originates from central site 14 or branch sites 18B-18N. In some examples, the header includes an "inner header," which is represented by an STAG header. Additionally, in some examples, the packet includes a tunnel header which represents an "outer header." Aggregation device processes the header using VNFs 66 (704). In some examples, VNFs 66 may represent a chain of services. For example, VNFs 66 may be software models each representing a virtualized model of computer hardware, and the VNFs 66 may execute tasks (e.g., security tasks and packet forwarding tasks) based on the respective virtualized models of computer hardware. For example, VNFs 66 may implement protocols or standards such as IEEE 802.1X authentication, IEEE 802.1BR, IP Source Guard, DHCP security, Captive Portal, VoIP provisioning, advanced ACL, or any combination thereof. In some cases, to process the packet, VNFs 66 may remove the outer header of the packet and cooperate with forwarding unit 80 and/or port extension service 92 to determine a next destination of the packet based on the inner header.

Aggregation device 30 performs a forwarding lookup (706) to determine the next destination of the packet. For example, aggregation device 30 may perform the forwarding lookup to determine if the packet is bound for the LAN (708) (e.g., if the next destination of the packet is one of satellite devices 32 coupled to aggregation device 30) or if the packet is bound for the WAN (e.g., if the next destination of the packet is WAN uplink port 41). To perform the forwarding lookup in order to determine if the packet is bound for the LAN, port extension service 92 and/or forwarding unit 80 may read the inner header (e.g., the ETAG header) of the packet and identify the destination of the packet. For example, port extension service 92 may determine whether the packet is bound for a destination host device that is coupled to a satellite device within branch site switch 22. In other words, port extension service 92 may determine whether the packet is bound for a destination host device within branch site 18A.

If aggregation device 30 determines that the packet is bound for the LAN ("YES" branch of block 708), aggregation device 30 determines, from the inner header of the packet, a destination host device coupled to a destination satellite device (710). For example, aggregation device 30 may determine that the packet is bound for host 54B coupled to satellite device 32A. Aggregation device 30 may use port extension service 92 to read the inner header of the packet and identify host 54A as the destination host device and identify satellite device 32N as the destination satellite device coupled to host 54A. Subsequently, aggregation device 30 may determine a cascade port of cascade ports 38 corresponding to the destination satellite device (712). In some examples, aggregation device 30 may determine the cascade port using forwarding unit 80 and/or port extension service 92. The destination host device may be coupled to the destination satellite device by an extended port. For example, host 54A is coupled to satellite device 32N by extended port 36A. In this way, and to determine the respective cascade port, aggregation device 30 may determine, using forwarding unit 80, the cascade port assigned to the extended port which is coupled to the destination host device 54A. Aggregation device 30 forwards the packet through the cascade port to the destination host device (e.g., host 54A) (714).

If aggregation device 30 determines that the packet is not bound for the LAN ("NO" branch of block 708), aggregation device 30 determines that the packet is bound to return to the WAN (716). Subsequently, aggregation device 30 may process the packet using VNFs 66 (718). Additionally, in some examples, aggregation device 30 may process the packet using port extension service 92. After the packet is processed using VNFs, aggregation device 30 may forward the processed packet to the WAN through WAN uplink port 41 (720).

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other medium that can be used to store desired program code in the form of instructions or data structures and that can be accessed by a computer. The term "computer-readable storage media" refers to non-transitory, tangible storage media, and not connections, carrier waves, signals, or other transitory media.

What is claimed is:

1. A system comprising:
a set of satellite network devices providing switching functionality; and
an aggregation network device configured to communicate with an orchestrator of a wide area network (WAN), wherein the aggregation network device serves as a master switch and is coupled to the set of satellite network devices via a set of cascade ports on the aggregation network device, and wherein the aggregation network device is configured to:
detect, using a port extension service virtual network function (VNF) executing on the aggregation network device, each satellite network device of the set of satellite network devices coupled to the aggregation network device;
send, to the orchestrator, data indicating the satellite network devices as respective sub-systems within a logical switch comprising the aggregation network device and the set of satellite network devices;
receive, from the orchestrator, configuration information for managing at least one sub-system within the logical switch; and
configure, by the port extension service based on the configuration information, the satellite network device of the set of satellite network devices corresponding to the at least one sub-system.

2. The system of claim 1, wherein the data represents the sub-systems as line cards connected to the logical switch.

3. The system of claim 1, wherein the aggregation network device is configured to register the set of satellite network devices by provisioning an IP address corresponding to each satellite network device of the set of satellite network devices.

4. The system of claim 3, wherein the aggregation network device is further configured to:
detect, using the port extension service, an additional satellite network device not included in the set of satellite network devices;
in response to detecting the additional satellite network device, register the additional satellite network device by provisioning an additional IP address corresponding to the additional satellite network device, wherein the additional satellite network device is coupled to the aggregation network device via the set of cascade ports;
send, to the orchestrator, data indicating the additional satellite network device as an additional sub-system within the logical switch;
receive, from the orchestrator, additional configuration information for managing the additional sub-system within the logical switch; and
configure, by the port extension service based on the additional configuration information, the additional satellite network device corresponding to the additional sub-system.

5. The system of claim 1, wherein the aggregation network device comprises a forwarding unit, and wherein the set of satellite network devices are configured to:
receive, from a source host device coupled to an extended port of a respective source satellite network device, a packet; and
forward, via an uplink port of the satellite network device, the packet to the aggregation network device, wherein the forwarding unit of the aggregation network device is configured to:
forward the packet to a respective destination satellite network device of the set of satellite network devices; or
forward the packet to the WAN.

6. The system of claim 5, wherein the aggregation network device is configured to:
receive the packet from the source satellite network device;
remove, using the port extension service, an outer tunnel header from the packet;
determine, using the port extension service and based on an inner header of the packet, that the packet is bound for a destination host device coupled to the destination satellite network device;
determine, using the port extension service, a cascade port of the set of cascade ports corresponding to the destination satellite network device; and
forward, using the forwarding unit, the packet through the cascade port to the destination host device.

7. The system of claim 6, wherein the destination host device is coupled to the destination satellite network device by a Power over Ethernet (PoE) port of a set of PoE ports, and wherein to determine the cascade port, the aggregation network device is configured to:
determine, using the port extension service, the cascade port assigned to the PoE port, wherein to forward the packet to the destination host device, the forwarding unit is configured to:
forward the packet to the host device via the PoE port.

8. The system of claim 5, wherein a set of VNFs in addition to the port extension service VNF are provisioned in the aggregation network device, and wherein the aggregation network device is configured to:
receive the packet from the source satellite network device;
remove, using the port extension service, an outer tunnel header from the packet;
determine, using the port extension service and based on an inner header of the packet, that the packet is bound for the WAN;
process the packet using the port extension service and the set of VNFs; and
forward the processed packet to the WAN through a WAN uplink port of the aggregation network device.

9. The system of claim 1, wherein the port extension service executes a link layer discovery protocol (LLDP) configured to detect each satellite network device of the set of satellite network devices coupled to the aggregation network device.

10. The system of claim 1, wherein the configuration information defines a first data structure representing a managed local area network (LAN) including the logical switch and the at least one sub-system, and wherein to configure the satellite network device of the set of satellite network devices, the aggregation network device is configured to:
restructure the configuration information such that the configuration information defines a second data structure referencing the aggregation network device and the set of satellite network devices; and configure, based on the configuration information, a set of connections between the set of satellite network devices and the aggregation network device.

11. The system of claim 10, wherein to configure the set of connections, the aggregation network device is configured to:
map, for each connection of the set of connections, an extended port of a respective satellite network device to a cascade port of the aggregation network device; and
establish the set of connections, enabling information to pass through each connection of the set of connections between the aggregation network device and the respective satellite network device.

12. The networking system of claim 1, wherein the aggregation network device is registered with the orchestrator.

13. The networking system of claim 1, wherein the aggregation network device is a universal customer premises equipment (uCPE) device.

14. A method comprising:
communicating, by an aggregation network device, with an orchestrator of a wide area network (WAN), wherein the aggregation network device serves as a master switch and is coupled to a set of satellite network devices via a set of cascade ports on the aggregation network device, wherein the set of satellite network devices provide switching functionality;
detecting, by the aggregation network device using a port extension service virtual network function (VNF) executing on the aggregation network device, each satellite network device of the set of satellite network devices coupled to the aggregation network device;
sending, by the aggregation network device to the orchestrator, data indicating the satellite network devices as respective sub-systems within a logical switch comprising the aggregation network device and the set of satellite network devices;
receiving, by the aggregation network device from the orchestrator, configuration information for managing at least one sub-system within the logical switch; and
configuring, by the port extension service based on the configuration information, the satellite network device of the set of satellite network devices corresponding to the at least one sub-system.

15. The method of claim 14, further comprising:
registering, by the aggregation network device, the set of satellite devices by provisioning an IP address corresponding to each satellite device of the set of satellite devices.

16. The method of claim 15, further comprising:
detecting, by the port extension service, an additional satellite device not included in the set of satellite devices;
in response to detecting the additional satellite device, registering, by the aggregation network device, the additional satellite device by provisioning an additional IP address corresponding to the additional satellite device, wherein the additional satellite device is coupled to the aggregation network device via the set of cascade ports;
sending, by the aggregation network device to the orchestrator, data indicating the additional satellite device as an additional sub-system within the logical switch;

receiving, by the aggregation network device from the orchestrator, additional configuration information for managing the additional sub-system within the logical switch; and
configuring, by the port extension service based on the additional configuration information, the additional satellite device corresponding to the additional sub-system.

17. The method of claim 14, wherein the configuration information defines a first data structure representing a managed local area network (LAN) including the logical switch and the at least one sub-system, and wherein configuring the satellite device of the set of satellite devices comprises:
restructuring the configuration information such that the configuration information defines a second data structure referencing the aggregation network device and the set of satellite devices; and
configuring, based on the configuration information, a set of connections between the set of satellite devices and the aggregation network device.

18. The method of claim 17, wherein configuring the set of connections comprises:
mapping, for each connection of the set of connections, an extended port of a respective satellite device to a cascade port of the aggregation network device; and
establishing the set of connections, enabling information to pass through each connection of the set of connections between the aggregation network device and the respective satellite device.

19. The method of claim 14, wherein the aggregation network device is a universal customer premises equipment (uCPE) device.

20. A non-transitory computer-readable storage medium storing instructions that when executed cause one or more programmable processors of an aggregation network device to:
communicate with an orchestrator of a wide area network (WAN), wherein the aggregation network device serves as a master switch and is coupled to a set of satellite network devices via a set of cascade ports on the aggregation network device, wherein the set of satellite network devices provide switching functionality;
detect, using a port extension service virtual network function (VNF) executing on the aggregation network device, each satellite network device of the set of satellite network devices coupled to the aggregation network device;
send, to the orchestrator, data indicating the satellite network devices as respective sub-systems within a logical switch comprising the aggregation network device and the set of satellite network devices;
receive, from the orchestrator, configuration information for managing at least one sub-system within the logical switch; and
configure, by the port extension service based on the configuration information, the satellite network device of the set of satellite network devices corresponding to the at least one sub-system.

* * * * *